(No Model.) 2 Sheets—Sheet 1.
W. L. MESSER.
WHEEL CENTER.
No. 496,837. Patented May 2, 1893.
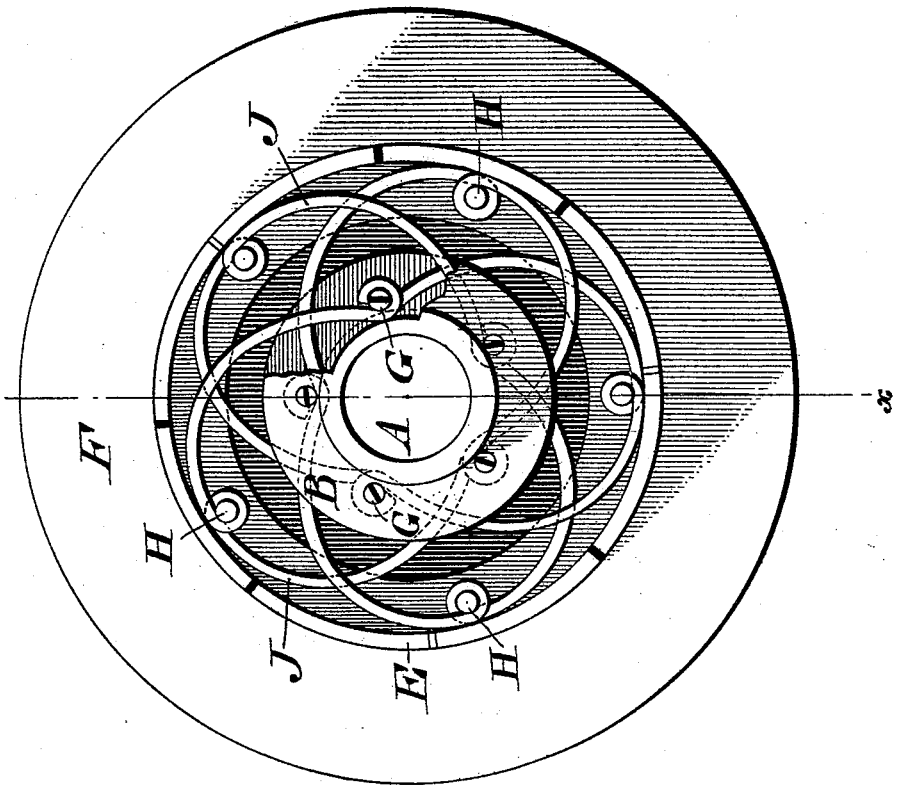
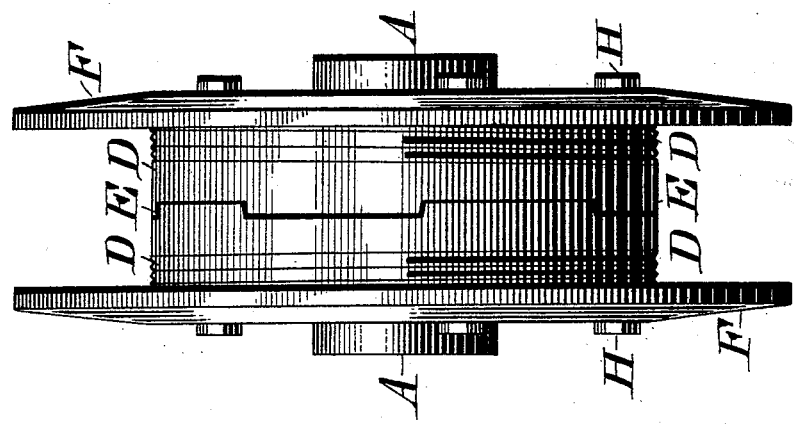
WITNESSES:
INVENTOR

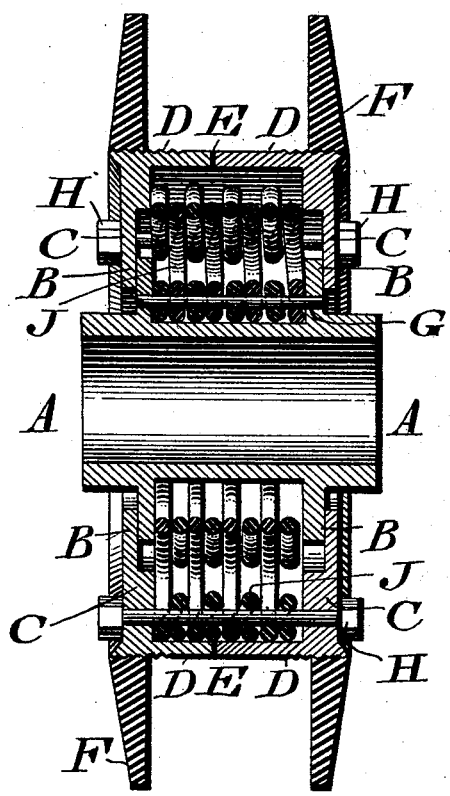

UNITED STATES PATENT OFFICE.

WALTER L. MESSER, OF SYRACUSE, NEW YORK, ASSIGNOR TO WALTER LADD MESSER AND HARLAN PAGE, TRUSTEES FOR THE MESSER ELASTIC ROTATOR COMPANY, OF PHILADELPHIA, PENNSYLVANIA.

WHEEL-CENTER.

SPECIFICATION forming part of Letters Patent No. 496,837, dated May 2, 1893.

Application filed December 10, 1892. Serial No. 454,728. (No model.)

*To all whom it may concern:*

Be it known that I, WALTER L. MESSER, a citizen of the United States, residing at Syracuse, in the county of Onondaga, State of New York, have invented a new and useful Improvement in Centers or Bodies for Vehicle-Wheels, Hubs, Pulleys, &c., which improvement is fully set forth in the following specification and accompanying drawings.

My invention consists of a center or body for a vehicle, bicycle or other wheel, a hub, a pulley, &c., which is formed of separate peripheral and central portions, the same being connected by springs, thus imparting elasticity to the center, and also adapting the periphery to yield when subjected to pressure or strain.

Figure 1 represents a side elevation of a center, &c., embodying my invention. Fig. 2 represents a side elevation of the interior thereof. Fig. 3 represents a section on line $x$, $x$, Fig. 2.

Similar letters of reference indicate corresponding parts in the several figures.

Referring to the drawings:—A designates a hub, from which radiate the flanges B, which are freely encircled by the annuli C, the outer peripheries of which have flanges D thereon, the same projecting inwardly or toward each other, forming the rim E.

F designates threaded bands which are fitted to the threaded portions of the rim E, and may be moved toward or from each other by proper rotation of the same.

G designates bolts which are connected with the flanges B, and H designates bolts which are connected with the annuli C, it being noticed that said bolts extend parallel with the hub A.

In the space formed by the rim E and hub A, are springs J, which are of bent form, and formed of coils or eyes fitted alternately or in somewhat zig-zag order on the bolts G and H, it being seen that the annuli C are connected with the flanges B of the hub, and consequently with the hub by said springs J, which connection is exceedingly firm in its nature, so that the parts may revolve as one, but the same is elastic or yielding.

The hub and rim with the intermediate parts may form the center of a wheel of a vehicle, &c., the hub being placed on an axle or bearing, so as to either revolve upon or with the same. Again, the rim E may form the periphery of said wheel, or the hub of a wheel may encircle the rim E, and be firmly secured thereto, the spokes of the wheel being secured to said hub. The bands F may be moved closely against the sides of said hub and be screwed, bolted or otherwise secured thereto, but in either case an elastic structure is provided which renders the riding or use of a wheel if that of a vehicle of an easy, gentle and comfortable nature.

Should there be any extraordinary pressure or strain upon the periphery of the wheel, whereby motion of the latter is resisted, said periphery may yield or hold back sufficiently to prevent injury to the parts. When the wheel is relieved of such pressure or strain, its periphery moves forward and so resumes its original position.

The flanges and annuli brace and sustain each other in lateral directions, and the bolts G and H serve to strengthen the structure, thus providing a strong, durable and serviceable device.

Having thus described my invention, what I claim as new, and desire to secure by Letters Patent, is—

1. A center or body consisting of a hub with radiating flanges, annuli encircling said flanges, having inwardly projecting flanges thereon, forming a rim, threaded bands fitting on said rim, bolts connecting said hub flanges, bolts connecting said annuli, and springs coiled on said bolts said parts being combined substantially as described.

2. A center or body consisting of hub and peripheral portions, and springs having eyes on their ends and intermediate of said ends, and which extend from one portion to the other, the peripheral portion being loosely mounted on the hub portion and connected by said springs, the ends and intermediate eyes being connected respectively with the bolts of said portions substantially as described.

3. A center or body consisting of a hub having flanges thereon, annuli freely encircling said flanges and having a rim, a band adjustable on said rim, and a coiled spring between said hub and rim, said parts being combined substantially as described.

4. A center or body formed of annuli with a peripheral rim and a hub portion separate therefrom having a flange radiating therefrom, and springs having eyes at their ends and intermediate of their ends and extending from the bolts of the rim to the bolts of the hub, and connecting said peripheral rim and hub portion, substantially as described.

5. A center or body consisting of a hub having flanges thereon, annuli encircling said flanges and having inwardly projecting flanges forming a rim, bands on said rim, and a coiled spring having eyes on securing bolts for said hub-flanges and annuli, said parts being combined substantially as described.

6. A center or body consisting of a hub with flanges, annuli encircling said flanges and having a rim, bands on said rim, bolts connecting said flanges, bolts connecting said annuli, and springs having eyes at their ends on the bolts of said flanges, and intermediate eyes on the bolts of said annuli, said parts being combined substantially as described.

7. A hub with radial flanges having connecting bolts annuli encircling said flanges and having connecting bolts, bands on a rim formed by the flanges of said annuli, and springs having coils or eyes fitted alternately on the bolts of said flanges and annuli, forming a yielding periphery, said parts being combined substantially as described.

WALTER L. MESSER.

Witnesses:
JOHN A. WIEDERSHEIM,
R. H. GRAESER.